(12) United States Patent
Zhao et al.

(10) Patent No.: US 10,705,413 B2
(45) Date of Patent: Jul. 7, 2020

(54) SUPPORTING MECHANISM, AND ADJUSTING DEVICE AND GIMBAL HAVING THE SAME

(71) Applicant: SZ DJI OSMO TECHNOLOGY CO., LTD., Shenzhen (CN)

(72) Inventors: Yanchong Zhao, Shenzhen (CN); Weidong Li, Shenzhen (CN); Guoyao Liu, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 44 days.

(21) Appl. No.: 16/013,670

(22) Filed: Jun. 20, 2018

(65) Prior Publication Data
US 2018/0299752 A1   Oct. 18, 2018

Related U.S. Application Data

(63) Continuation of application No. PCT/CN2015/098383, filed on Dec. 23, 2015.

(51) Int. Cl.
*G03B 17/56* (2006.01)
*F16M 11/18* (2006.01)
(Continued)

(52) U.S. Cl.
CPC ......... *G03B 17/561* (2013.01); *F16M 11/045* (2013.01); *F16M 11/048* (2013.01);
(Continued)

(58) Field of Classification Search
None
See application file for complete search history.

(56) References Cited

U.S. PATENT DOCUMENTS 3,940,777 A * 2/1976 Komine ................. G03B 17/14
 396/85
4,601,557 A * 7/1986 Bogle ....................... G03B 3/10
 352/140

(Continued)

FOREIGN PATENT DOCUMENTS

CN 201060679 Y 5/2008
CN 202066585 U 12/2011
(Continued)

OTHER PUBLICATIONS

The World Intellectual Property Organization (WIPO) International Search Report for PCT/CN2015/098383 dated Oct. 9, 2016 6 Pages.

*Primary Examiner* — Noam Reisner
*Assistant Examiner* — Dennis Hancock
(74) *Attorney, Agent, or Firm* — Anova Law Group, PLLC

(57) ABSTRACT

A supporting mechanism includes a mounting assembly, a supporting assembly, and a connection assembly. The mounting assembly is configured to be coupled to a gimbal. The supporting assembly is configured to be coupled to an auxiliary apparatus. The connection assembly includes an assembling member. One end of the assembling member is rotatably connected to the mounting assembly, and another end of the assembling member is movably connected to the supporting assembly. A position of the auxiliary apparatus relative to the gimbal is adjustable by adjusting a position of the supporting assembly and a position of the assembling member relative to the mounting assembly.

20 Claims, 8 Drawing Sheets

US 10,705,413 B2

Page 2

(51) Int. Cl.
*F16M 11/04* (2006.01)
*F16M 11/20* (2006.01)
*F16M 13/00* (2006.01)
*F16M 13/04* (2006.01)
*G03B 13/34* (2006.01)

(52) U.S. Cl.
CPC ........... *F16M 11/18* (2013.01); *F16M 11/205* (2013.01); *F16M 13/00* (2013.01); *F16M 13/04* (2013.01); *G03B 13/34* (2013.01); *G03B 17/563* (2013.01)

(56) References Cited

U.S. PATENT DOCUMENTS

| | | | | |
|---|---|---|---|---|
| 4,782,356 | A | * | 11/1988 | Sano ................ G02B 7/305 396/116 |
| 5,267,044 | A | * | 11/1993 | Nozaki ................ G02B 7/36 348/347 |
| 2003/0025802 | A1 | * | 2/2003 | Mayer, Jr. ............ G03B 7/12 348/211.99 |
| 2013/0271619 | A1 | | 10/2013 | Longmore et al. |
| 2014/0037278 | A1 | * | 2/2014 | Wang .................. F16M 11/10 396/55 |
| 2015/0131983 | A1 | | 5/2015 | Thayer et al. |

FOREIGN PATENT DOCUMENTS

| | | |
|---|---|---|
| CN | 202546177 U | 11/2012 |
| CN | 103197489 A | 7/2013 |
| CN | 203927315 U | 11/2014 |
| CN | 203930299 U | 11/2014 |
| CN | 104704279 A | 6/2015 |
| CN | 204420489 U | 6/2015 |
| CN | 104781581 A | 7/2015 |
| CN | 205278695 U | 6/2016 |
| DE | 202009014504 U1 | 2/2010 |
| EP | 0696702 A1 | 2/1996 |
| JP | S62262034 A | 11/1987 |
| JP | 2007219197 A | 8/2007 |
| JP | 5547729 B2 | 7/2014 |
| JP | 2015040909 A | 3/2015 |
| WO | 2007095950 A1 | 8/2007 |

* cited by examiner

SUPPORTING MECHANISM, AND ADJUSTING DEVICE AND GIMBAL HAVING THE SAME

CROSS-REFERENCE TO RELATED APPLICATION

This application is a continuation of International Application No. PCT/CN2015/098383, filed on Dec. 23, 2015, the entire contents of which are incorporated herein by reference.

TECHNICAL FIELD

The present disclosure relates to a supporting mechanism, and an adjusting device and a gimbal having the supporting mechanism.

BACKGROUND OF THE DISCLOSURE

An electric gimbal can carry an electronic device such as a video camera or an image camera for photographing. An auxiliary apparatus such as an audio recorder or a follow focus can be provided to a gimbal for recording and zooming during photographing. Existing gimbals are not equipped with a dedicated mechanism for mounting the auxiliary apparatus. An additional mounting mechanism has to be added to the gimbal to support the auxiliary apparatus. However, the mounting mechanism has an inflexible structure such that the auxiliary apparatus mounted thereon cannot be adjusted to a required position.

SUMMARY OF THE DISCLOSURE

In view of above technical problem in the conventional technologies, there is a need to provide a supporting mechanism that is easily adjusted, and an adjusting device and a gimbal having the supporting mechanism.

An aspect of the disclosure discloses a supporting mechanism for carrying an auxiliary apparatus and coupling the auxiliary apparatus onto a gimbal, the supporting mechanism comprising a mounting assembly and a supporting assembly. The supporting mechanism can further comprise a connection assembly which comprises an assembling member, one end of the assembling member being rotatably connected to the mounting assembly, and the other end of the assembling member being movably connected to the supporting assembly. The supporting assembly can be configured to couple to the auxiliary apparatus, such that a position of the auxiliary apparatus relative to the gimbal can be adjustable to satisfy actual requirements.

In some embodiments, the supporting mechanism can further comprise an adjusting assembly provided between the mounting assembly and the connection assembly, the adjusting assembly being configured to adjust a coupling position of the connection assembly relative to the mounting assembly.

In some embodiments, the adjusting assembly can comprise a coupling member provided on the mounting assembly and a translational adjusting member slidably provided on the coupling member. The connection assembly can be coupled on the translational adjusting member.

In some embodiments, the coupling member can comprise a guiding portion. The translational adjusting member can comprise a sliding portion, the sliding portion being slidably fitted with the guiding portion.

In some embodiments, two said guiding portions can be provided spaced from each other, the sliding portion being slidably provided between the two guiding portions.

In some embodiments, a stopping portion can protrude from the guiding portion, and a sliding slot corresponding to the stopping portion can be provided on the sliding portion. The stopping portion can protrude into the sliding slot, such that the sliding portion can be slidably fitted with the guiding portion.

In some embodiments, the adjusting assembly can further comprise an engaging member. The engaging member can be provided on the coupling member and partially protrude into the sliding slot to fix the translational adjusting member on the coupling member.

In some embodiments, the engaging member can comprise an engaging portion and an abutting portion provided on the engaging portion, the engaging portion being fixed on the coupling member using a fastener, the abutting portion protruding into the sliding slot to abut the translational adjusting member against the coupling member.

In some embodiments, the coupling member can further comprise a first supporting portion and a second supporting portion spaced from each other, the first supporting portion and the second supporting portion being connected to the mounting assembly. The guiding portion can be provided on one of the first supporting portion and the second supporting portion.

In some embodiments, the coupling member can further comprise a sleeving portion, the sleeving portion being connected with the first supporting portion and the second supporting portion, and the sleeving portion being adjustably sleeved on the mounting assembly.

In some embodiments, two said sleeving portions can be provided, the two sleeving portions being spaced from each other, and each of the sleeving portions being connected with the first supporting portion and the second supporting portion respectively, such that the coupling member can be provided as a ring.

In some embodiments, the adjusting assembly can further comprise a fastener, the fastener passing through the first supporting portion and the second supporting portion. A distance between the first supporting portion and the second supporting portion can be reduced by tightening the fastener, such that an inner diameter of the sleeving portion can be reduced and thereby the sleeving portion can be firmly sleeved on the mounting assembly.

In some embodiments, the connection assembly can further comprise a connector by which the assembling member can be rotatably connected to the translational adjusting member. The supporting assembly can be connected to the connector.

In some embodiments, the adjusting assembly can further comprise a rotational adjusting member provided on the translational adjusting member, the rotational adjusting member being snap fitted with the connector.

In some embodiments, a plurality of adjusting portions can be provided on one of the rotational adjusting member and the connector, and a fitting portion corresponding to the adjusting portion can be provided on the other one of the rotational adjusting member and the connector, the fitting portion being sequentially snap fitted with the plurality of adjusting portions to adjust a coupling angle of the connector relative to the translational adjusting member.

In some embodiments, the plurality of adjusting portions can be arranged along a circumference of a circle spaced from one another.

In some embodiments, one said fitting portion can be provided.

In some embodiments, a plurality of said fitting portions can be provided, the plurality of fitting portions being arranged along a circumference of a circle spaced from one another.

In some embodiments, the plurality of adjusting portions can be a plurality of adjusting teeth arranged along a circumference of a circle, such that the plurality of adjusting teeth can form a toothed disc structure.

In some embodiments, the fitting portion can be a toothed disc provided opposite to the plurality of adjusting teeth.

In some embodiments, the connector can further comprise a snap portion, one of the fitting portion and the adjusting portion being provided on a side of the snap portion, the assembling member being inserted into the snap portion.

In some embodiments, the snap portion can comprise a ring portion and two locking portions, the ring portion being a non-closed ring, the two locking portions being respectively provided at two ends of the ring portion and spaced from each other. The two locking portions can be connected and fastened by a fastener, such that an inner diameter of the ring can be reduced to clamp the snap portion onto the assembling member by the ring portion.

In some embodiments, the assembling member can comprise a rod portion and a connecting portion provided on the rod portion, the connecting portion being adjustably sleeved on the supporting assembly, and the rod portion being connected to the mounting assembly.

In some embodiments, the connecting portion can comprise a ring portion and two locking portions, the ring portion being a non-closed ring, the two locking portions being respectively provided at two ends of the ring portion and spaced from each other. The two locking portions can be connected and fastened by a fastener, such that an inner diameter of the ring can be reduced to clamp the connecting portion onto the supporting assembly by the ring portion.

In some embodiments, two said connecting portions are provided, the two connecting portions being respectively provided at two ends of the rod portion, and the two connecting portions being adjustably connected to the supporting assembly and the mounting assembly respectively.

In some embodiments, the supporting assembly can comprise a supporting member provided on the assembling member, the supporting member being movably provided on the assembling member.

In some embodiments, the supporting assembly can further comprise a carrying member sleeved on the supporting member, an external connecting portion being provided on the carrying member and being configured to couple to the auxiliary apparatus.

In some embodiments, the external connecting portion can be a mounting groove which can be configured to fit with the auxiliary apparatus to fix the auxiliary apparatus.

In some embodiments, the carrying member can further comprise a ring portion and two locking portions, the ring portion being a non-closed ring, the two locking portions being respectively provided at two ends of the ring portion and spaced from each other. The two locking portions can be connected and fastened by a fastener, such that an inner diameter of the ring can be reduced and clamp the carrying member onto the supporting member by the ring portion.

In some embodiments, the external connecting portion can be provided on one of the two locking portions, or, the external connecting portion can be provided on the ring portion.

In some embodiments, the mounting assembly can comprise a fixing member and a mounting member fixedly provided on the fixing member, the fixing member being configured to connect with the gimbal, and the assembling member being connected to the mounting member.

In some embodiments, the mounting member can be a mounting rod. Two said mounting rods can be provided, the two mounting rods being provided on the fixing member spaced from each other.

In some embodiments, a connection hole for connecting with the gimbal can be provided on the fixing member.

In some embodiments, the auxiliary apparatus can be a follow focus, an audio recorder or a shutter controller.

Another aspect of the disclosure discloses an adjusting device for adjusting a focal length or an aperture of an imaging device carried on a gimbal, the adjusting device comprising an adjuster. The adjusting device can further comprise a supporting mechanism comprising a mounting assembly, a supporting assembly and a connection assembly, the connection assembly comprising an assembling member, one end of the assembling member being rotatably connected to the mounting assembly, and the other end of the assembling member being rotatably connected to the supporting assembly. The adjuster can be provided on the supporting assembly. A position of the adjuster relative to the gimbal can be adjustable by adjusting a position of the supporting assembly and a position of the assembling member relative to the mounting assembly to satisfy actual requirements.

In some embodiments, the adjuster can comprise a driving member provided on the supporting assembly and an adjusting ring connected to the driving member, the adjusting ring being sleeved on a circumference of a lens of the imaging device and configured to adjust the focal length or aperture of the imaging device.

In some embodiments, a transmission member can be provided between the driving member and the adjusting ring, the driving member driving the adjusting ring to rotate through the transmission member.

In some embodiments, the transmission member can be a transmission gear, and a driven tooth fitted with the transmission gear can be provided on an outer circumference of the adjusting ring.

In some embodiments, the driving member can be a brush motor or a brushless motor.

In some embodiments, a holding portion abutting against the lens of the imaging device can be provided on the outer circumference of the adjusting ring.

In some embodiments, the adjuster can further comprise an operating knob provided on the transmission member.

In some embodiments, the adjuster can comprise a mounting base for coupling the imaging device, the mounting base being configured to connect with the gimbal and adjust a coupling height of the imaging device relative to the gimbal.

In some embodiments, the supporting mechanism can further comprise an adjusting assembly provided between the mounting assembly and the connection assembly, the adjusting assembly being configured to adjust a coupling position of the connection assembly relative to the mounting assembly.

In some embodiments, the adjusting assembly can comprise a coupling member provided on the mounting assembly and a translational adjusting member slidably provided on the coupling member. The connection assembly can be coupled on the translational adjusting member.

In some embodiments, the coupling member can comprise a guiding portion. The translational adjusting member can comprise a sliding portion, the sliding portion being slidably fitted with the guiding portion.

In some embodiments, two said guiding portions can be provided spaced from each other, the sliding portion being slidably provided between the two guiding portions.

In some embodiments, a stopping portion can protrude from the guiding portion, and a sliding slot corresponding to the stopping portion can be provided on the sliding portion. The stopping portion can protrude into the sliding slot, such that the sliding portion can be slidably fitted with the guiding portion.

In some embodiments, the adjusting assembly can further comprise an engaging member. The engaging member can be provided on the coupling member and partially protrude into the sliding slot to fix the translational adjusting member on the coupling member.

In some embodiments, the engaging member can comprise an engaging portion and an abutting portion provided on the locking portion, the engaging portion being fixed on the coupling member using a fastener, the abutting portion protruding into the sliding slot to abut the translational adjusting member against the coupling member.

In some embodiments, the coupling member can further comprise a first supporting portion and a second supporting portion spaced from each other, the first supporting portion and the second supporting portion being connected to the mounting assembly. The guiding portion can be provided on one of the first supporting portion and the second supporting portion.

In some embodiments, the coupling member can further comprise a sleeving portion, the sleeving portion being connected with the first supporting portion and the second supporting portion, and the sleeving portion being adjustably sleeved on the mounting assembly.

In some embodiments, two said sleeving portions can be provided, the two sleeving portions being spaced from each other, and each of the sleeving portions being connected with the first supporting portion and the second supporting portion respectively, such that the coupling member can be provided as a ring.

In some embodiments, the adjusting assembly can further comprise a fastener, the fastener passing through the first supporting portion and the second supporting portion. A distance between the first supporting portion and the second supporting portion can be reduced by tightening the fastener, such that an inner diameter of the sleeving portion can be reduced and thereby the sleeving portion can be firmly sleeved on the mounting assembly.

In some embodiments, the connection assembly can further comprise a connector by which the assembling member can be rotatably connected to the translational adjusting member. The supporting assembly can be connected to the connector.

In some embodiments, the adjusting assembly can further comprise a rotational adjusting member provided on the translational adjusting member, the rotational adjusting member being snap fitted with the connector.

In some embodiments, a plurality of adjusting portions can be provided on one of the rotational adjusting member and the connector, and a fitting portion corresponding to the adjusting portion can be provided on the other one of the rotational adjusting member and the connector, the fitting portion being sequentially snap fitted with the plurality of adjusting portions to adjust a coupling angle of the connector relative to the translational adjusting member.

In some embodiments, the plurality of adjusting portions can be arranged along a circumference of a circle spaced from one another.

In some embodiments, one said fitting portion can be provided.

In some embodiments, a plurality of said fitting portions can be provided, the plurality of fitting portions being arranged along a circumference of a circle spaced from one another.

In some embodiments, the plurality of adjusting portions can be a plurality of adjusting teeth arranged along a circumference of a circle, such that the plurality of adjusting teeth can form a toothed disc structure.

In some embodiments, the fitting portion can be a toothed disc provided opposite to the plurality of adjusting teeth.

In some embodiments, the connector can further comprise a snap portion, one of the fitting portion and the adjusting portion being provided on a side of the snap portion, the assembling member being inserted into the snap portion.

In some embodiments, the snap portion can comprise a ring portion and two locking portions, the ring portion being a non-closed ring, the two locking portions being respectively provided at two ends of the ring portion and spaced from each other. The two locking portions can be connected and fastened by a fastener, such that an inner diameter of the ring can be reduced to clamp the snap portion onto the assembling member by the ring portion.

In some embodiments, the assembling member can comprise a rod portion and a connecting portion provided on the rod portion, the connecting portion being adjustably sleeved on the supporting assembly, and the rod portion being connected to the mounting assembly.

In some embodiments, the connecting portion can comprise a ring portion and two locking portions, the ring portion being a non-closed ring, the two locking portions being respectively provided at two ends of the ring portion and spaced from each other. The two locking portions can be connected and fastened by a fastener, such that an inner diameter of the ring can be reduced to clamp the connecting portion onto the supporting assembly by the ring portion.

In some embodiments, two said connecting portions can be provided, the two connecting portions being respectively provided at two ends of the rod portion, and the two connecting portions being adjustably connected to the supporting assembly and the mounting assembly respectively.

In some embodiments, the supporting assembly can comprise a supporting member provided on the assembling member, the supporting member being movably provided on the assembling member.

In some embodiments, the supporting assembly can further comprise a carrying member sleeved on the supporting member, an external connecting portion being provided on the carrying member and being configured to couple to the adjuster.

In some embodiments, the external connecting portion can be a mounting groove which can be configured to fit with the adjuster to fix the adjuster.

In some embodiments, the carrying member can further comprise a ring portion and two locking portions, the ring portion being a non-closed ring, the two locking portions being respectively provided at two ends of the ring portion and spaced from each other. The two locking portions can be connected and fastened by a fastener, such that an inner diameter of the ring can be reduced and clamp the carrying member onto the supporting member by the ring portion.

In some embodiments, the external connecting portion can be provided on one of the two locking portions, or, the external connecting portion can be provided on the ring portion.

In some embodiments, the mounting assembly can comprise a fixing member and a mounting member fixedly provided on the fixing member, the fixing member being configured to connect with the gimbal, and the assembling member being connected to the mounting member.

In some embodiments, the mounting member can be a mounting rod. Two said mounting rods can be provided, the two mounting rods being provided on the fixing member spaced from each other.

In some embodiments, a connection hole for connecting with the gimbal can be provided on the fixing member.

A further aspect of the disclosure discloses a gimbal, comprising a supporting body and a carrying platform provided on the supporting body. The gimbal can further comprise a supporting mechanism which can comprise a mounting assembly, a supporting assembly and a connection assembly, the mounting assembly being provided on the carrying platform. The connection assembly can comprise an assembling member, one end of the assembling member being rotatably connected to the mounting assembly, and the other end of the assembling member being movably connected to the supporting assembly. The supporting assembly can be configured to couple an auxiliary apparatus, such that a position of the auxiliary apparatus relative to the gimbal can be adjustable to satisfy actual requirements.

In some embodiments, the gimbal can further comprise an adjuster, the adjuster being provided on the supporting assembly and configured to adjust a focal length or an aperture of an imaging device carried on the gimbal. A position of the adjuster relative to the gimbal can be adjustable by adjusting a position of the supporting assembly and a position of the assembling member relative to the mounting assembly to satisfy actual requirements.

In some embodiments, the adjuster can comprise a driving member provided on the supporting assembly and an adjusting ring connected to the driving member, the adjusting ring being sleeved on a circumference of a lens of the imaging device and configured to adjust the focal length or aperture of the imaging device.

In some embodiments, a transmission member can be provided between the driving member and the adjusting ring, the driving member driving the adjusting ring to rotate through the transmission member.

In some embodiments, the transmission member is a transmission gear, and a driven tooth fitted with the transmission gear can be provided on an outer circumference of the adjusting ring.

In some embodiments, the driving member can be a brush motor or a brushless motor.

In some embodiments, a holding portion abutting against the lens of the imaging device can be provided on the outer circumference of the adjusting ring.

In some embodiments, the adjuster can further comprise an operating knob provided on the transmission member.

In some embodiments, the adjuster can comprise a mounting base for coupling the imaging device, the mounting base being provided on the carrying platform and configured to adjust a coupling height of the imaging device relative to the carrying platform.

In some embodiments, the supporting mechanism can further comprise an adjusting assembly provided between the mounting assembly and the connection assembly, the adjusting assembly being configured to adjust a coupling position of the connection assembly relative to the mounting assembly.

In some embodiments, the adjusting assembly can comprise a coupling member provided on the mounting assembly and a translational adjusting member slidably provided on the coupling member. The connection assembly can be coupled on the translational adjusting member.

In some embodiments, the coupling member can comprise a guiding portion. The translational adjusting member can comprise a sliding portion, the sliding portion being slidably fitted with the guiding portion.

In some embodiments, two said guiding portions can be provided spaced from each other, the sliding portion being slidably provided between the two guiding portions.

In some embodiments, a stopping portion can protrude from the guiding portion, and a sliding slot corresponding to the stopping portion can be provided on the sliding portion. The stopping portion can protrude into the sliding slot, such that the sliding portion can be slidably fitted with the guiding portion.

In some embodiments, the adjusting assembly can further comprise an engaging member. The engaging member can be provided on the coupling member and partially protrudes into the sliding slot to fix the translational adjusting member on the coupling member.

In some embodiments, the engaging member can comprise an engaging portion and an abutting portion provided on the locking portion, the engaging portion being fixed on the coupling member using a fastener, the abutting portion protruding into the sliding slot to abut the translational adjusting member against the coupling member.

In some embodiments, the coupling member can further comprise a first supporting portion and a second supporting portion spaced from each other, the first supporting portion and the second supporting portion being connected to the mounting assembly. The guiding portion can be provided on one of the first supporting portion and the second supporting portion.

In some embodiments, the coupling member can further comprise a sleeving portion, the sleeving portion being connected with the first supporting portion and the second supporting portion, and the sleeving portion being adjustably sleeved on the mounting assembly.

In some embodiments, two said sleeving portions can be provided, the two sleeving portions being spaced from each other, and each of the sleeving portions being connected with the first supporting portion and the second supporting portion respectively, such that the coupling member can be provided as a ring.

In some embodiments, the adjusting assembly can further comprise a fastener, the fastener passing through the first supporting portion and the second supporting portion. A distance between the first supporting portion and the second supporting portion can be reduced by tightening the fastener, such that an inner diameter of the sleeving portion can be reduced and thereby the sleeving portion can be firmly sleeved on the mounting assembly.

In some embodiments, the connection assembly can further comprise a connector through which the assembling member can be roatably connected to the translational adjusting member. The supporting assembly can be connected to the connector.

In some embodiments, the adjusting assembly can further comprise a rotational adjusting member provided on the translational adjusting member, the rotational adjusting member being snap fitted with the connector.

In some embodiments, a plurality of adjusting portions can be provided on one of the rotational adjusting member and the connector, and a fitting portion corresponding to the adjusting portion is provided on the other one of the rotational adjusting member and the connector, the fitting portion being sequentially snap fitted with the plurality of adjusting portions to adjust a coupling angle of the connector relative to the translational adjusting member.

In some embodiments, the plurality of adjusting portions can be arranged along a circumference of a circle spaced from one another.

In some embodiments, one said fitting portion can be provided.

In some embodiments, a plurality of said fitting portions can be provided, the plurality of fitting portions being arranged along a circumference of a circle spaced from one another.

In some embodiments, the plurality of adjusting portions can be a plurality of adjusting teeth arranged along a circumference of a circle, such that the plurality of adjusting teeth can form a toothed disc structure.

In some embodiments, the fitting portion can be a toothed disc provided opposite to the plurality of adjusting teeth.

In some embodiments, the connector can further comprise a snap portion, one of the fitting portion and the adjusting portion being provided on a side of the snap portion, the assembling member being inserted into the snap portion.

In some embodiments, the snap portion can comprise a ring portion and two locking portions, the ring portion being a non-closed ring, the two locking portions being respectively provided at two ends of the ring portion and spaced from each other. The two locking portions can be connected and fastened by a fastener, such that an inner diameter of the ring can be reduced to clamp the snap portion onto the assembling member by the ring portion.

In some embodiments, the assembling member can comprise a rod portion and a connecting portion provided on the rod portion, the connecting portion being adjustably sleeved on the supporting assembly, and the rod portion being connected to the mounting assembly.

In some embodiments, the connecting portion can comprise a ring portion and two locking portions, the ring portion being a non-closed ring, the two locking portions being respectively provided at two ends of the ring portion and spaced from each other. The two locking portions can be connected and fastened by a fastener, such that an inner diameter of the ring can be reduced to clamp the connecting portion onto the supporting assembly by the ring portion.

In some embodiments, two said connecting portions can be provided, the two connecting portions being respectively provided at two ends of the rod portion, and the two connecting portions being adjustably connected to the supporting assembly and the mounting assembly respectively.

In some embodiments, the supporting assembly can comprise a supporting member provided on the assembling member, the supporting member being movably provided on the assembling member.

In some embodiments, the supporting assembly can further comprise a carrying member sleeved on the supporting member, an external connecting portion being provided on the carrying member and being configured to couple to the auxiliary apparatus.

In some embodiments, the external connecting portion can be a mounting groove which can be configured to fit with the auxiliary apparatus to fix the auxiliary apparatus.

In some embodiments, the carrying member can further comprise a ring portion and two locking portions, the ring portion being a non-closed ring, the two locking portions being respectively provided at two ends of the ring portion and spaced from each other. The two locking portions can be connected and fastened by a fastener, such that an inner diameter of the ring can be reduced and clamp the carrying member onto the supporting member by the ring portion.

In some embodiments, the external connecting portion can be provided on one of the two locking portions, or, the external connecting portion can be provided on the ring portion.

In some embodiments, the mounting assembly can comprise a fixing member and a mounting member fixedly provided on the fixing member, the fixing member being fixedly provided on the carrying platform, and the assembling member being connected to the mounting member.

In some embodiments, the mounting member can be a mounting rod. Two said mounting rods can be provided, the two mounting rods being provided on the fixing member spaced from each other.

In some embodiments, a connection hole for connecting with the carrying platform can be provided on the fixing member.

The coupling position and the coupling angle of the connection assembly of the supporting mechanism relative to the mounting assembly can be adjusted, such that the coupling position and the coupling angle of the adjuster on the gimbal, which adjuster being supported on the supporting assembly, can be conveniently adjusted.

LIST OF REFERENCE NUMERALS

TABLE 1

Figure 1:
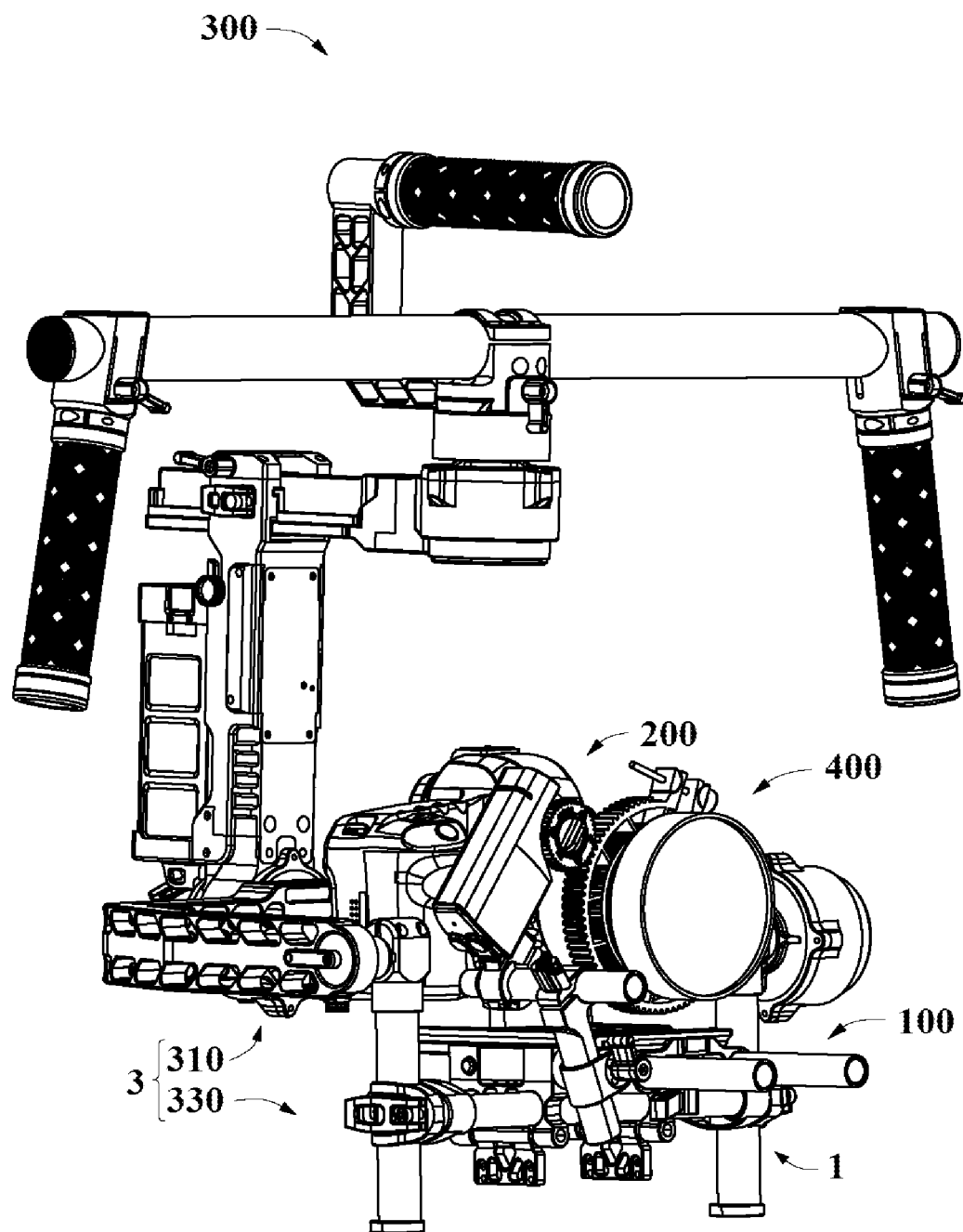
FIG. 1 shows a gimbal in operating state according to a first embodiment of the disclosure.
Figure 2:
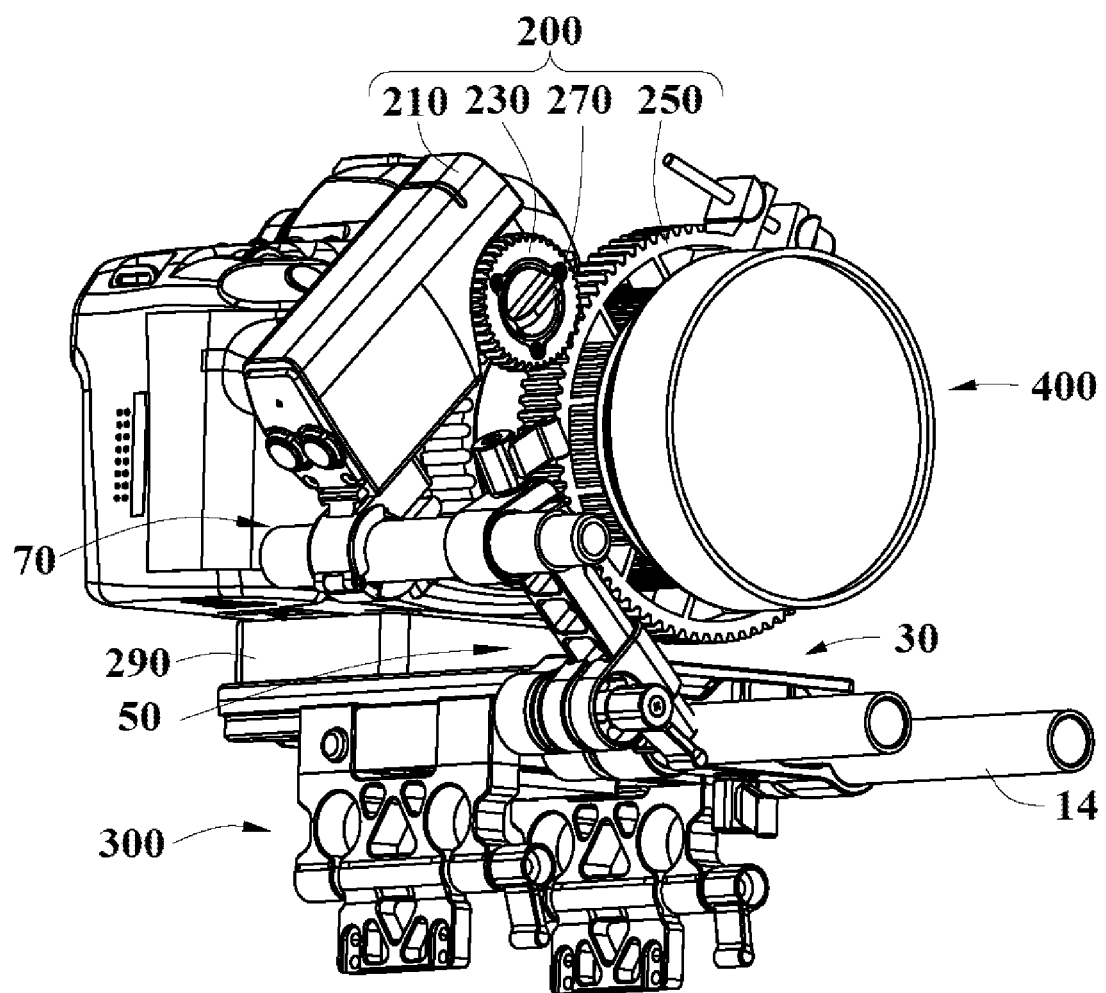
FIG. 2 shows an adjusting device of the gimbal in operating state shown in FIG. 1.
Figure 3:
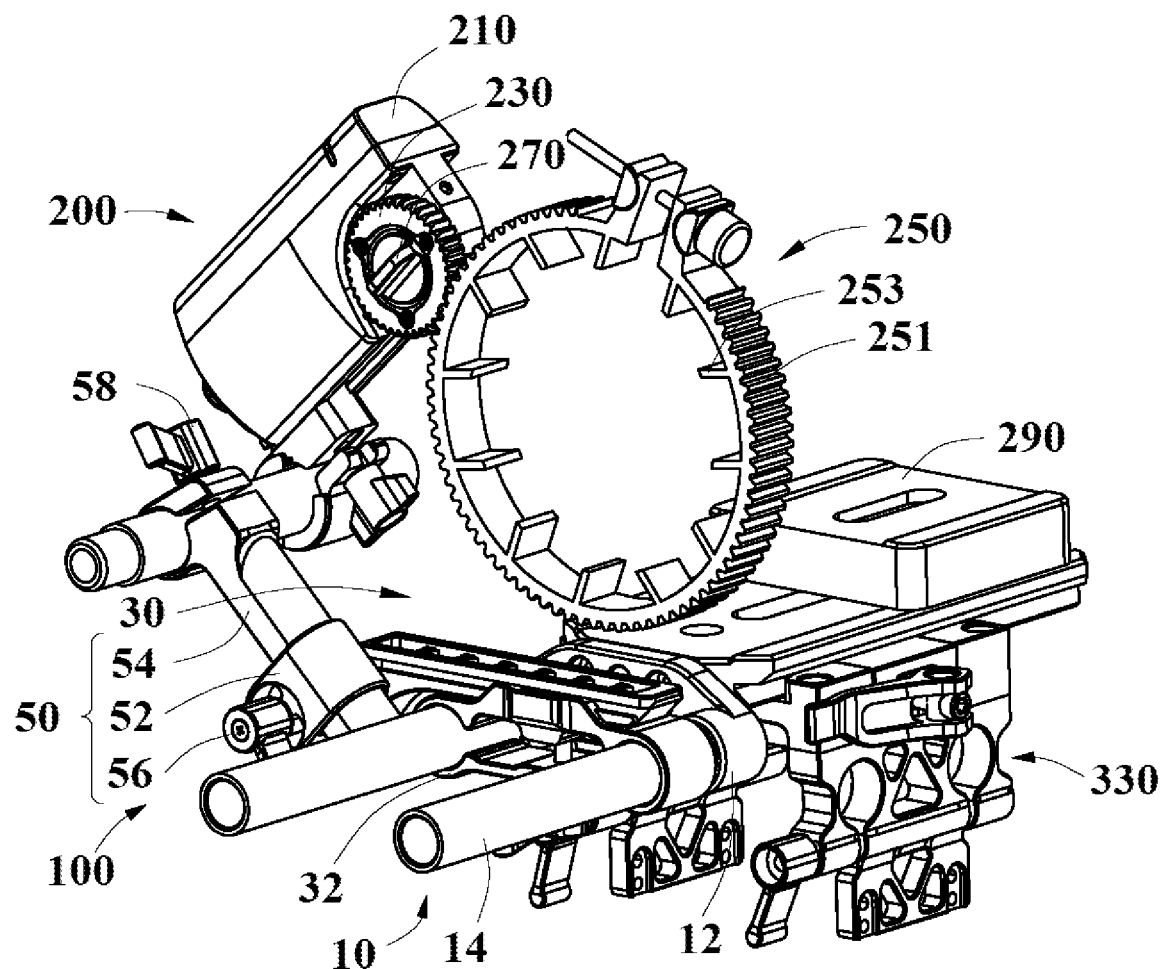
FIG. 3 shows a perspective view of the adjusting device of the gimbal shown in FIG. 1.
Figure 4:
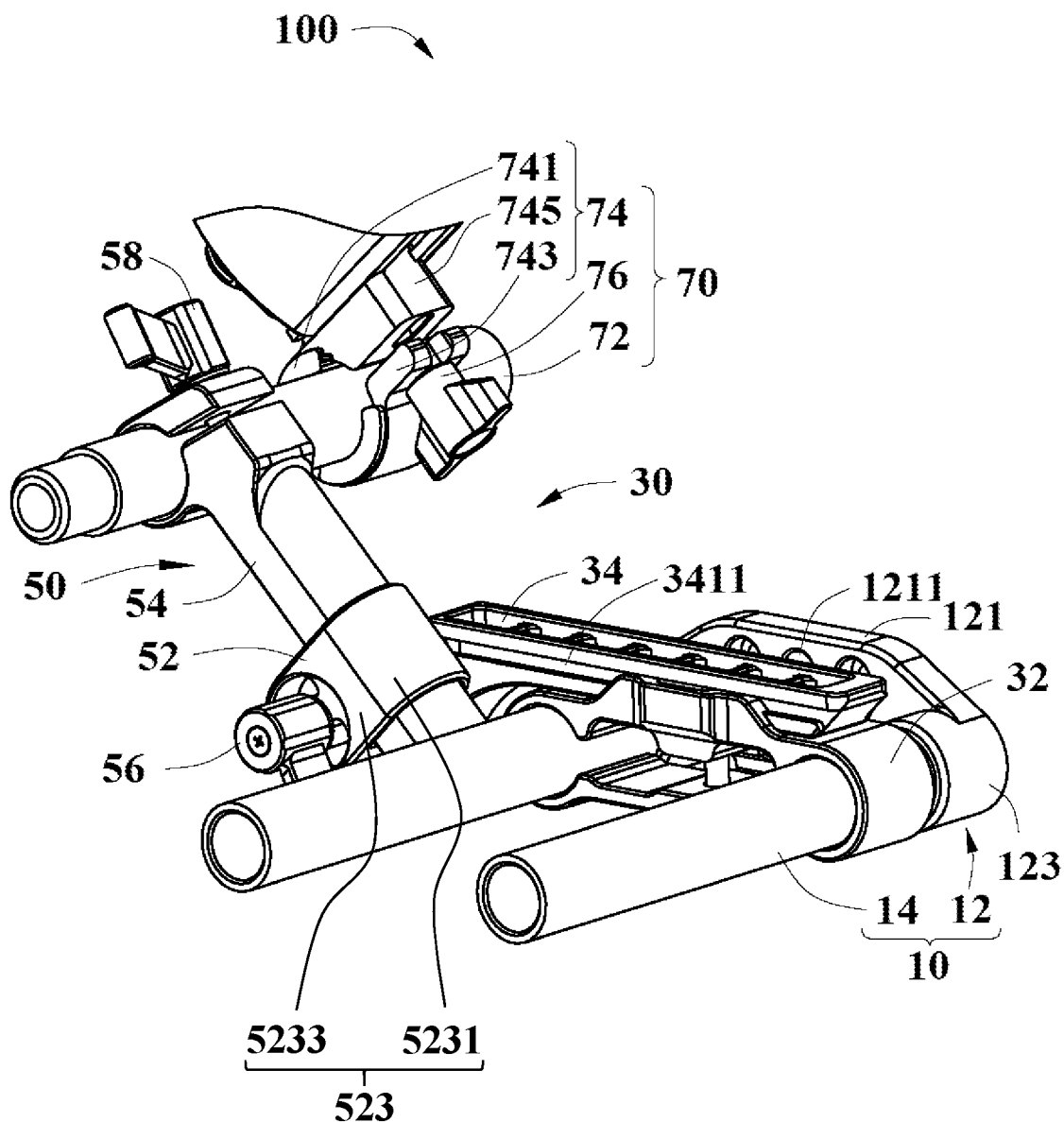
FIG. 4 shows a perspective view of a supporting mechanism of the adjusting device shown in FIG. 3.
Figure 5:
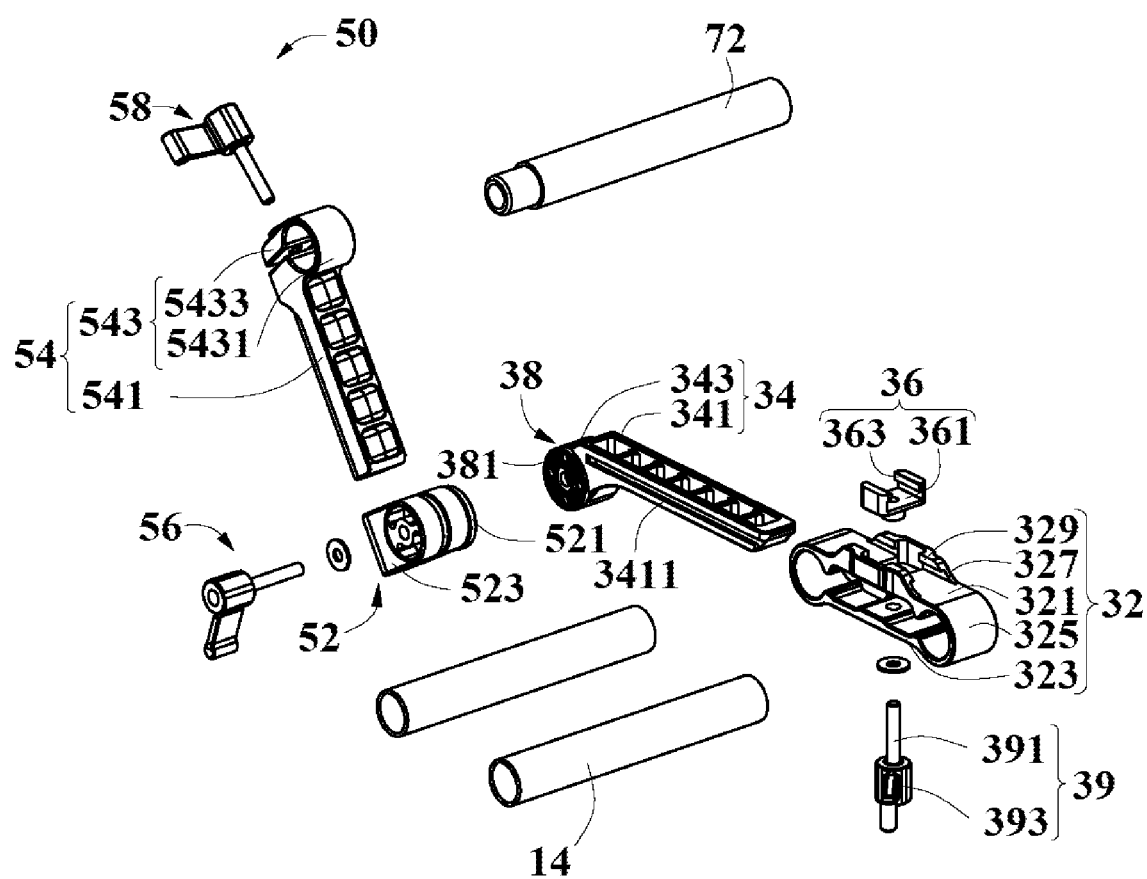
FIG. 5 shows an exploded view of the supporting mechanism of the adjusting device shown in FIG. 4.

| | |
|---|---|
| Gimbal | 300 |
| Adjusting device | 1 |
| Supporting mechanism | 100 |
| Mounting assembly | 10 |
| Fixing member | 12 |
| Mounting portion | 121 |
| Connection hole | 1211 |
| Fixing portion | 123 |
| Mounting member | 14, 614 |
| Adjusting assembly | 30 |
| Coupling member | 32 |
| First supporting portion | 321 |
| Second supporting portion | 323 |
| Sleeving portion | 325 |
| Guiding portion | 327 |
| Stopping portion | 329 |
| Translational adjusting member | 34 |
| Sliding portion | 341 |
| Sliding slot | 3411 |

TABLE 1-continued

| | |
|---|---|
| Connection portion | 343 |
| Engaging member | 36 |
| Engaging portion | 361 |
| Abutting portion | 363 |
| Rotational adjusting member | 38 |
| Adjusting portion | 381 |
| Fastener | 39 |
| Fastening portion | 391 |
| Operating portion | 393 |
| Connection assembly | 50, 64 |
| Connector | 52 |
| Fitting portion | 521 |
| Snap portion | 523 |
| Ring portion | 5231 |
| Locking portion | 5233 |
| Assembling member | 54 |
| Rod portion | 541, 641 |
| Connecting portion | 543, 643 |
| Ring portion | 5431, 6431 |
| Locking portion | 5433, 6433 |
| Fastener | 56, 58 |
| Supporting assembly | 70 |
| Supporting member | 72, 672 |
| Carrying member | 74 |
| Ring portion | 741 |
| Locking portion | 743 |
| External connecting portion | 745 |
| Fastener | 76 |
| Adjuster | 200 |
| Driving member | 210 |
| Transmission member | 230 |
| Adjusting ring | 250 |
| Driven tooth | 251 |
| Holding portion | 253 |
| Operating knob | 270 |
| Mounting base | 290 |
| Carrying device | 3 |
| Supporting body | 310 |
| Carrying platform | 330 |
| Imaging device | 400 |

Illustrative embodiments of the present disclosure will be described in detail by reference to the drawings.

DETAILED DESCRIPTION OF THE EMBODIMENTS

A better understanding of the disclosure will be obtained by reference to the following detailed description that sets forth illustrative embodiments with reference to the drawings. It will be apparent that, the embodiments described herein are merely provided by way of example only. Those skilled in the art can conceive other embodiments in light of those embodiments disclosed herein without inventive efforts, and all these embodiments are within the scope of the disclosure.

It is apparent that, if a component is described as "being fixed to" another component, it can be directly fixed to the other component, or an intermediate component can be provided therebetween. If a component is described as "being coupled to" another component, it can be directly coupled to the other component, or an intermediate component can be provided therebetween. If a component is described as "being disposed on" another component, it can be disposed directly on the other component, or an intermediate component can be provided therebetween. Terms such as "vertical", "horizontal", "left", "right", as used in the disclosure, are merely illustrative.

Unless otherwise defined, technical and scientific terms, as used in the disclosure, have the same meaning as commonly understood by those skilled in the field of the disclosure. The terms as used in the disclosure are intended to illustrate the embodiments, not to limit the disclosure. The term "and/or", as used in the disclosure, comprises any and all combinations of one or more items as listed.

Illustrative embodiments of the disclosure are described with reference to the drawings. The embodiments and features can be combined with one another provided they are technically compatible.

Referring to FIG. 1, a first embodiment of the disclosure provides a gimbal 300 which can be configured to carry an imaging device 400 such as a video camera or an image camera to capture images. The gimbal 300 can comprise a carrying device 3 and an adjusting device 1. The carrying device 3 can be provided to carry the imaging device 400. The adjusting device 1 can be provided on the carrying device 3 and connected with the imaging device 400, such that a user can adjust a focal length or an aperture of the imaging device 400 using the adjusting device 1.

In some embodiments, the gimbal 300 can be a tri-axial gimbal. The carrying device 3 can be a primary supporting member of the tri-axial gimbal, and can comprise a supporting body 310 and a carrying platform 330 provided on the supporting body 310. A configuration of the supporting body 310 can be similar to that of a conventional tri-axial gimbal, a description of which will be omitted for conciseness. The carrying platform 330 can be configured to carry the imaging device 400 and the adjusting device 1.

It will be appreciated that, the gimbal 300 can be provided as other types of gimbals, such as a bi-axial gimbal. A configuration of the supporting body 310 can vary depending on the type of the gimbal 300, a description of which will be omitted for conciseness.

The adjusting device 1 can comprise a supporting mechanism 100 provided on the carrying platform 330 and an adjuster 200 provided on the supporting mechanism 100.

Referring to FIGS. 2-5, the supporting mechanism 100 can comprise a mounting assembly 10, an adjusting assembly 30, a connection assembly 50 and a supporting assembly 70. In some embodiments, the mounting assembly 10 can be fixed to the carrying platform 330. The adjusting assembly 30 can be adjustably provided on the mounting assembly 10. The connection assembly 50 can be rotatably provided on the adjusting assembly 30. The supporting assembly 70 can be adjustably provided on the connection assembly 50. The supporting assembly 70 can be configured to support the adjuster 200. A position of the connection assembly 50 and a position the supporting assembly 70 relative to the carrying platform 330 can be adjusted by adjusting a position of the adjusting assembly 30 relative to the mounting assembly 10, such that a relative position of the adjuster 200 on the gimbal 300 can be adjusted.

The mounting assembly 10 can comprise a fixing member 12 and a mounting member 14 provided on the fixing member 12.

The fixing member 12 can comprise a mounting portion 121 and a fixing portion 123 provided on the mounting portion 121. A connection hole 1211 can be provided on the mounting portion 121, and the mounting portion 121 can be connected to the carrying platform 330 through a fastener such as a bolt. It will be appreciated that, an intermediate part can be provided between the mounting portion 121 and the carrying platform 330 which is fixedly provided on the carrying platform 330. The mounting portion 121 can be mounted on the intermediate part through the fastener, such that the mounting portion 121 is connected to and mounted on the carrying platform 330. It will be appreciated that, the intermediate part can be optionally omitted, and the mounting portion 121 can be directly coupled on the carrying platform 330 using the fastener.

The fixing portion 123 can be provided as a substantially hollow cylindrical rod. In some embodiments, two fixing portions 123 can be provided which protrude from two ends of the mounting portion 121 respectively. The fixing portions 123 can be configured to fix the mounting member 14.

The mounting member 14 can be provided as a substantially hollow cylindrical rod. The mounting member 14 can be provided substantially perpendicular to the fastener 12. In some embodiments, two mounting members 14 can be provided which are fixed to the two fixing portions 123. One end of each of the mounting members 14 can be fixedly inserted into one of the fixing portions 123, such that a loosening or shaking of the mounting member 14 can be prevented in supporting the adjusting assembly 30.

The adjusting assembly 30 can be coupled on the mounting member 14 to adjust a coupling position and a coupling angle of the connection assembly 50 relative to the mounting assembly 10. The adjusting assembly 30 can comprise a coupling member 32, a translational adjusting member 34, an engaging member 36 and a rotational adjusting member 38. In some embodiments, the coupling member 32 can be sleeved on the mounting member 14. The translational adjusting member 34 can be slidably coupled on the coupling member 32. The engaging member 36 can pass through the coupling member 32 and the translational adjusting member 34 to fix the translational adjusting member 34 to the coupling member 32. The rotational adjusting member 38 can be fixedly coupled on the translational adjusting member 34.

In some embodiments, the coupling member 32 can be provided as a substantially closed ring configuration which can comprise a first supporting portion 321, a second supporting portion 323, a sleeving portion 325 and a guiding portion 327.

The first supporting portion 321 and the second supporting portion 323 can be provided facing each other with a space therebetween and substantially parallel to each other. Two sleeving portions 325 can be provided. One sleeving portions 325 can be provided at a respective end of the first supporting portion 321 and connected with the first supporting portion 321 and the second supporting portion 323, such that the coupling member 32 is provided as a closed ring configuration. The coupling member 32 can be sleeved on the mounting member 14 through the sleeving portions 325.

The guiding portion 327 can be provided on a side of the first supporting portion 321 opposite to the second supporting portion 323. The guiding portion 327 can guide a motion direction of the translational adjusting member 34 relative to the coupling member 32. In some embodiments, two guiding portions 327 can be provided which are respectively provided on two opposite sides of the first supporting portion 321. Each of the guiding portions 327 can extend in a direction opposite to the second supporting portion 323. The two guiding portion 327 can be substantially parallel to each other, such that a guide groove (not labeled) can be formed between the two guiding portions 327. The guide groove can extend in a direction that is substantially perpendicular to a length direction of the mounting member 14. The guide groove can slidably receive the translational adjusting member 34. A stopping portion 329 can be provided on a side of each of the guiding portions 327 that faces the guide groove. The stopping portion 329 can protrude from the guiding portion 327. The stopping portion 329 can be fitted with the translational adjusting member 34 to guide the motion direction of the translational adjusting member 34 relative to the coupling member 32. It will be appreciated that, a position of the first supporting portion 321 and a position of the second supporting portion 323 can be interchanged, and the guiding portion 327 can be provided on one of the first supporting portion 321 and the second supporting portion 323.

One end of the translational adjusting member 34 can be slidably inserted into the guide groove. The translational adjusting member 34 can comprise a sliding portion 341 and a connection portion 343 provided on the sliding portion 341.

The sliding portion 341 can be substantially provided as a rod. The sliding portion 341 can be provided with a sliding slot 3411 extending along a length thereof on two sides of the sliding portion. The sliding slot 3411 can be fitted with the stopping portion 329 to guide a sliding direction of the translational adjusting member 34 relative to the coupling member 32. The stopping portion 329 on the guiding portion 327 can protrude into the sliding slot 3411 when the sliding portion 341 is inserted into the guide groove, thereby preventing the translational adjusting member 34 from being released from the guide groove in a direction perpendicular to the guide groove. The connection portion 343 can be provided at one end of the sliding portion 341 and on a side of the installation member 32. The connection portion 343 can be configured to install the rotational adjusting member 38.

It will be appreciated that, a sliding fit between the translational adjusting member 34 and the coupling member 32 is not limited to the illustrative embodiment in which a sliding slot fits with a sliding rail, but can be implemented with other sliding fit configurations For example, the translational adjusting member 34 and the coupling member 32 can be an adjustable sleeving configuration, and a coupling position of the translational adjusting member 34 relative to the coupling member 32 can be adjusted by a relative sliding between the translational adjusting member 34 and the coupling member 32 in an axial direction.

The engaging member 36 can be provided to the coupling member 32 and the translational adjusting member 34. In some instances, the engaging member 36 can be provided between the two guiding portions 327. The engaging member 36 can be configured to fix the translational adjusting member 34 to the coupling member 32. The engaging member 36 can comprise an engaging portion 361 and an abutting portion 363 provided on the engaging portion 361.

In some embodiments, the engaging portion 361 can be provided with a substantially "U" shape. The engaging portion 361 can be provided on a bottom of the guide groove and abut against the two guiding portions 327 and the first supporting portion 321. The abutting portion 363 can be formed on the engaging portion 361 and disposed corresponding to the sliding slot 3411 of the translational adjusting member 34. When the sliding portion 341 of the translational adjusting member 34 is inserted into the guide groove, the sliding portion 341 can pass through the engaging portion 361 of the engaging member 36, and meanwhile the abutting portion 363 can protrude into the sliding slot 3411, such that the engaging member 36 can be fitted with the sliding slot 3411. The abutting portion 363 can abut against a sidewall of the sliding slot 3411 by locking the engaging member 36 onto the first supporting portion 321 using a locking member. In other words, the translational adjusting member 34 can be fixed to the coupling member 32. In some instances, the locking member can be a threaded connector such as a screw or a bolt. Optionally, the locking member can be another mechanical connection assembly such as a snap fit.

In some instances, in order to conveniently mount and adjust the translational adjusting member 34, a fastener 39 can be provided to the coupling member 32 which passes through the second supporting portion 323, the first supporting portion 321, the engaging member 36 and the translational adjusting member 34 in this order to fix the translational adjusting member 34 onto the coupling member 32.

In some embodiments, the fastener 39 can comprise a fastening portion 391 and an operating portion 393 provided on the fastening portion 391. A connecting thread can be provided on the fastening portion 391 which is to be threadedly connected to the engaging member 36. The operating portion 393 can be an operation handle to provide a portion to be operated by a user in tightening the fastener 39. A distance between the first supporting portion 321 and the second supporting portion 323 can be adjusted by adjusting a depth of screwing the fastener 39 into the engaging member 36. Meanwhile, a degree of sleeving the coupling member 32 on the mounting member 14 can be adjusted by adjusting an inner diameter of the sleeving portion 325, such that the user can adjust a position of the coupling member 32 relative to the mounting member 14 to satisfy actual requirements. In addition, a degree of locking the engaging member 36 on the first supporting portion 321 can be adjusted by adjusting a depth of screwing the fastener 39 into the engaging member 36. In other words, a degree of locking of the translational adjusting member 34 on the coupling member 32 can be adjusted, such that the user can adjust a coupling position of the translational adjusting member 34 relative to the coupling member 32 to satisfy actual requirements.

The rotational adjusting member 38 can be provided at an end of the translational adjusting member 34. The rotational adjusting member 38 can be configured to connect with the connection assembly 50 and to adjust a coupling angle of the connection assembly 50 relative to the mounting assembly 10.

In some instances, a plurality of adjusting portions 381 can be provided on a side of the rotational adjusting member 38 opposite to the translational adjusting member 34. The plurality of adjusting portions 381 can be fitted with the connection assembly 50 to position a coupling angle of the connection assembly 50 relative to the mounting assembly 10. In some embodiments, the adjusting portion 381 can be an adjusting tooth. The plurality of adjusting portions 381 can be arranged along a circumference of a circle with a spacing therebetween, such that the rotational adjusting member 38 can be provided as a toothed disc. An axis of the rotational adjusting member 38 can be substantially parallel to a length direction of the mounting member 14.

The connection assembly 50 can be connected to the rotational adjusting member 38. The connection assembly 50 can comprise a connector 52 and an assembling member 54. In some embodiments, the connector 52 can be adjustably fitted to the rotational adjusting member 38. The assembling member 54 can be coupled to the connector 52 using a fastener 56.

The connector 52 can comprise a fitting portion 521 and a snap portion 523 provided on the fitting portion 521.

The fitting portion 521 can be disposed opposite to the adjusting portion 381. The fitting portion 521 can be fitted with the adjusting portion 381, such that a coupling angle of the connector 52 relative to the rotational adjusting member 38 can be secured. In some embodiments, the fitting portion 521 can be provided as a tooth. A plurality of fitting portions 521 can be provided which are arranged along a circumference of a circle with a spacing therebetween, such that the fitting portion 521 can be provided as a toothed disc. The fitting portion 521 and the adjusting portion 381 can be substantially coaxially provided and engaged with each other.

It will be appreciated that, in other embodiments, one or more fitting portions 521 can be provided. The one or more fitting portions 521 can be sequentially fitted with a plurality of adjusting teeth of the adjusting portion 381, thereby securing a coupling angle of the connector 521 relative to the rotational adjusting member 38.

It will be appreciated that, in other embodiments, a position where the fitting portion 521 being disposed and a position of the adjusting portion 381 being disposed can be interchanged. For instance, the adjusting portion 381 can be provided on the assembling member 54, while the fitting portion 521 can be provided on the rotational adjusting member 38, such that the fitting portion 521 can be sequentially snap fitted with a plurality of adjusting teeth of the adjusting portion 381, thereby securing the coupling angle of the connector 52 relative to the rotational adjusting member 38.

It will be appreciated that, structures of the fitting portion 521 and the adjusting portion 381 are not limited to the toothed disc as discussed hereinabove, but can be provided with other snap-fit structures. For example, the fitting portion 521 and the adjusting portion 381 can be provided as a protrusion and a groove respectively that are fitted with each other, such that the coupling angle of the connector 52 relative to the rotational adjusting member 38 can be secured by the snap-fit between the fitting portion 521 and the adjusting portion 381. For another example, the fitting portion 521 and the adjusting portion 381 can be provided as other mechanical snap structures, a description of which will be omitted for conciseness.

The snap portion 523 can be provided on a side of the fitting portion 521 to connect with the assembling member 54. The snap portion 523 can comprise a ring portion 5231 and two locking portions 5233. The ring portion 5231 can be a non-closed ring having an axis substantially perpendicular to an axis of the fitting portion 521. The two locking portions 5233 can be respectively disposed at two ends of the ring portion 5231 and spaced from each other. The two locking portions 5233 can be connected and fastened by a fastener 56, such that an inner diameter of the ring portion 5231 is reduced to clamp the snap portion 523 onto the assembling member 54 by the ring portion 5231.

In some instances, the fitting portion 521 can be disposed on a side of one of the locking portions 5233. The fastener 56 can first pass through the two locking portions 5233, then pass through the fitting portion 521 and the rotational adjusting member 38, and then be screwed to the connection portion 343 of the translational adjusting member 34, such that the connector 52 is connected to the rotational adjusting member 38. When the coupling angle of the connector 52 relative to the rotational adjusting member 38 is to be adjusted, the fastener 56 can be first released, then the connector 52 can be rotated by a desired angle, and then the fastener 56 can be locked onto the translational adjusting member 34, such that the fitting portion 521 and the adjusting portion 381 can be snap fitted with each other.

The assembling member 54 can comprise a rod portion 541 and a connecting portion 543 provided on the rod portion 541. One end of the rod portion 541 can be a mounting end (not labeled) through which the rod portion 541 can be connected to the mounting member 14. In some embodiments, the mounting end of the rod portion 541 can be inserted into the ring portion 5231 of the snap portion 523. The connecting portion 543 can be provided at an end of the rod portion 541 that is distal from the snap portion 523. The connecting portion 543 can have a configuration substantially similar to the snap portion 523. For instance, the connecting portion 543 can comprise a ring portion 5431 and two locking portions 5433. The ring portion 5431 can be a non-closed ring having an axis being substantially perpendicular to an axis of the ring portion 5231 of the snap portion 523. The two locking portions 5433 can be respectively disposed at two ends of the ring portion 5431 and spaced from each other. The two locking portions 5433 can be connected and fastened by a fastener 58, such that an inner diameter of the ring portion 5431 is reduced to clamp the connecting portion 543 onto the supporting assembly 70 by the ring portion 5431.

The supporting assembly 70 can be coupled to the assembling member 54 to install the adjuster 200. The supporting assembly 70 can comprise a supporting member 72 and a carrying member provided on the supporting member 72.

The supporting member 72 can be substantially provided as a rod. The supporting member 72 can be inserted into the ring portion 5431 of the assembling member 54. The carrying member 74 can be adjustably sleeved on the supporting member 72 and have a configuration substantially similar to the connecting portion 543. For instance, the carrying member 74 can comprise a ring portion 741 and two locking portions 743. The ring portion 741 can be a non-closed ring and sleeved on the supporting member 72. The two locking portions 743 can be respectively disposed at two ends of the ring portion 741 and spaced from each other. The two locking portions 743 can be connected and fastened by a fastener, such that an inner diameter of the ring portion 741 is reduced to clamp the carrying member 74 onto the supporting member 72 by the ring portion 741. In some instances, an external connecting portion 745 can be provided on the carrying member 74 and disposed on one of the two locking portions 743. In some embodiments, the external connecting portion 745 can be a mounting groove for coupling the adjuster 200. It will be appreciated that, the external connecting portion 745 can be optionally provided on the ring portion 741 of the carrying member 74.

The adjuster 200 can be provided on the carrying member 74. The adjuster 200 can comprise a driving member 210, a transmission member 230 and an adjusting ring 250. In some embodiments, the driving member 210 can be provided on the external connecting portion 745, the transmission member 230 can be provided between the driving member 210 and the adjusting ring 250, and the driving member 210 can drive the adjusting ring 250 to rotate through the transmission member 230.

In some embodiments, the driving member 210 can be a motor including any suitable type of motor such as a brushless motor or a brush motor. The transmission member 230 can be a gear. The transmission member 230 can be provided at an output end of the driving member 210. The adjusting ring 250 can be provided with a substantially ring shape. The adjusting ring 250 can be sleeved on and abut against a circumference of a lens of the imaging device 400. A driven tooth 251 can be provided on an outer circumference of the adjusting ring 250 and engaged with the transmission member 230. A holding portion 253 can be provided on an inner circumference of the adjusting ring 250. The holding portion 253 can be made of an elastic material which abuts against the circumference of the lens of the imaging device 400, such that the adjusting ring 250 can drive the lens to rotate to effect a zooming of the imaging device 400.

In some instances, in order to facilitate a user to manually adjust a focal length or an aperture of the imaging device 400, the transmission member 230 can be provided with an operating knob 270. The operating knob 270 can be fixedly connected with the transmission member 230. The transmission member 230 can be driven to rotate the adjusting ring 250 by rotating the operating knob 270, such that a manual zooming of the imaging device 400 can be effected.

In some instances, the adjuster 200 can comprise a mounting base 290 (referring to FIGS. 1-3) that is provided on the carrying platform 330. In some embodiments, the mounting base 290 can be substantially provided as a block. The mounting base 290 can be configured to adjust a coupling height of the imaging device 400 relative to the carrying platform 330 to assist the supporting mechanism 100 in adjusting a coupling position of the adjusting ring 250 relative to the imaging device 400.

Figure 6:
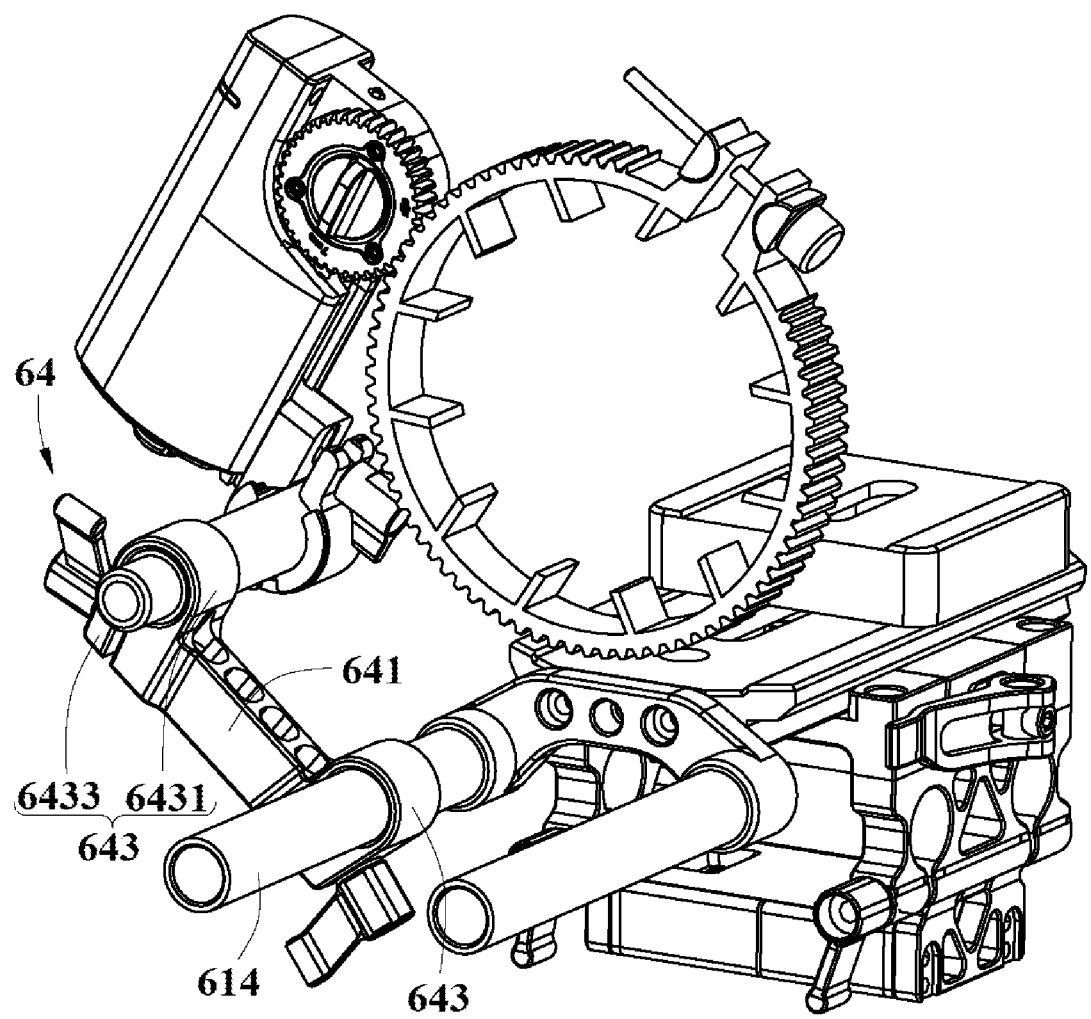
FIG. 6 shows a perspective view of an adjusting device of a gimbal according to a second embodiment of the disclosure.
Figure 7:
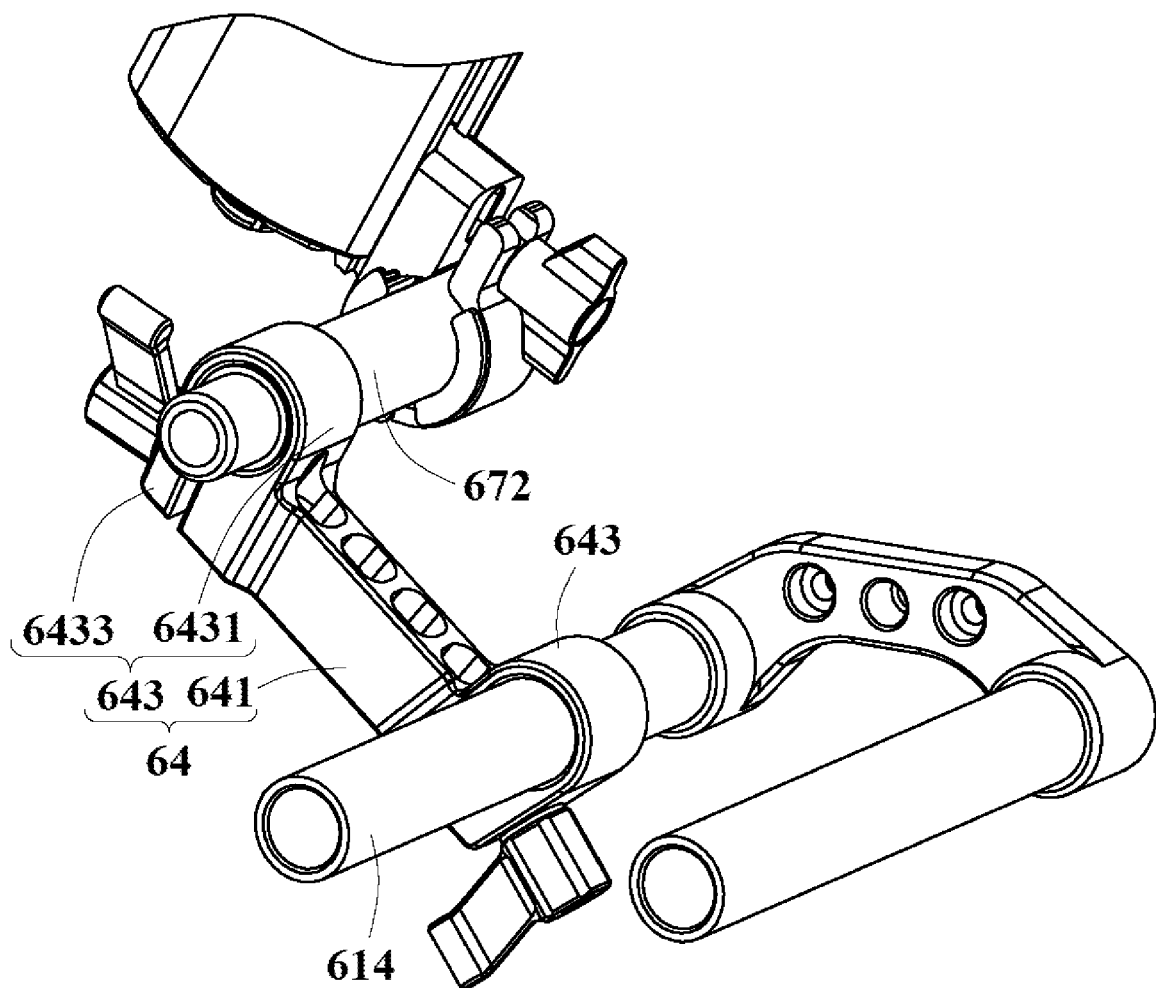
FIG. 7 shows a perspective view of a supporting mechanism of the adjusting device shown in FIG. 6.
Figure 8:
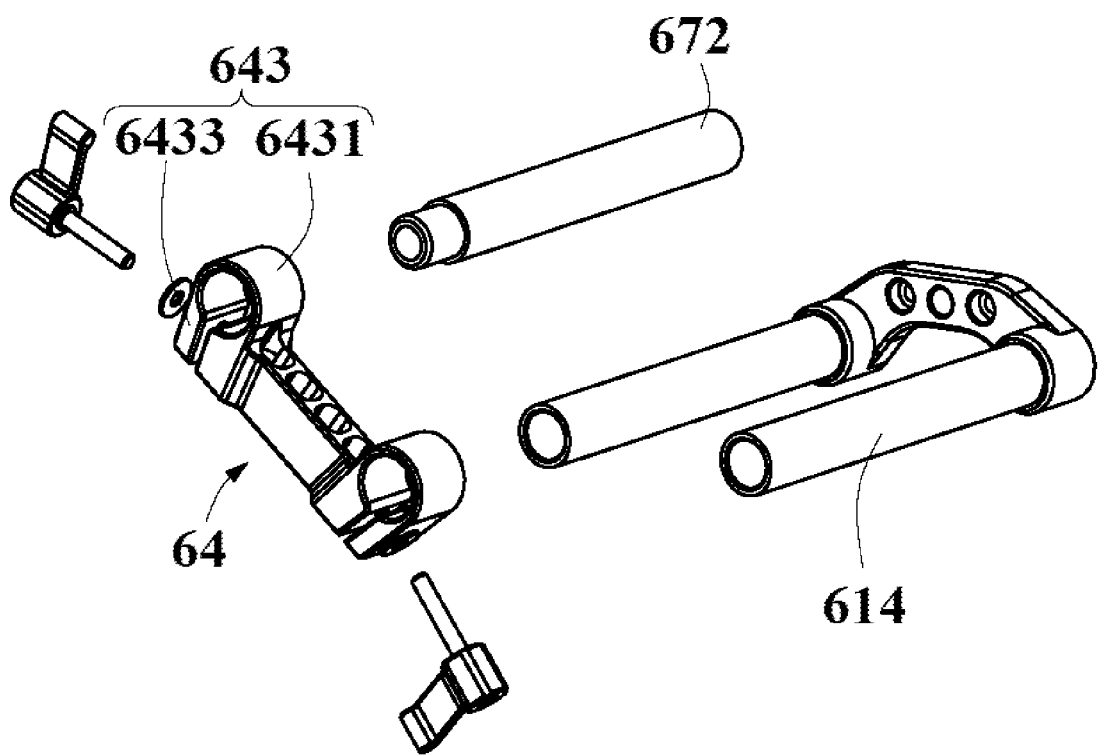
FIG. 8 is an exploded view of the supporting mechanism of the adjusting device shown in FIG. 7.

Referring to FIGS. 6-8, an adjusting device of the second embodiment can be provided with a configuration substantially identical to the adjusting device of the first embodiment. The adjusting device of the second embodiment can differ from the adjusting device of the first embodiment in the following aspects.

In the supporting mechanism of the adjusting device of the second embodiment, the adjusting assembly as provided in the first embodiment can be omitted. The connection assembly can be directly coupled on a mounting assembly, and a coupling position and a coupling angle of the connection assembly relative to the mounting assembly can be adjustable.

The connection assembly 64 of the second embodiment can comprise an assembling member (not labeled). The assembling member can comprise a rod portion 641 and a connecting portion 643 provided on the rod portion 641. Two connecting portions 643 can be provided which are respectively provided at two opposite ends of the rod portion 641. In some embodiments, the two connecting portions 643 can be symmetrically provided on the rod portion 641.

Each of the connecting portions 643 can comprise a ring portion 6431 and two locking portions 6433. The ring portion 6431 can be a non-closed ring. The two locking portions 6433 can be respectively provided at two ends of the ring portion 6431 and spaced from each other. The two locking portions 6433 can be connected and fastened by a fastener, such that an inner diameter of the ring portion 6431 can be reduced to clamp the connecting portion 643 onto the mounting member 614 and/or the supporting member 672 by the ring portion 6431. The inner diameter of the ring portion 6431 can be increased by releasing the fastener, such that the user can adjust a coupling position and a coupling angle of the assembling member relative to the mounting member 614 and/or the supporting member 672, and a coupling position of the adjuster on the gimbal can be adjusted.

The adjusting device as discussed hereinabove comprises a supporting mechanism to support the adjuster. The coupling position and the coupling angle of the connection assembly of the supporting mechanism relative to the mounting assembly can be adjusted, such that the coupling position and the coupling angle of the adjuster on the gimbal, which adjuster being supported on the supporting mechanism, can also be conveniently adjusted.

It will be appreciated that, in addition to the adjuster, the supporting mechanism can be configured to support a recorder, a shutter controller or other auxiliary apparatus.

The foregoing embodiments are intended to merely illustrate rather than limit the disclosure. While some embodiments of the disclosure have been shown and described herein, it will be obvious to those skilled in the art that such embodiments are provided by way of example only. Numerous variations and substitutions will occur to those skilled in the art without departing from the scope of the disclosure. Various alterations may be made to the present disclosure by those skilled in the art within the spirit of the present disclosure so long as the alterations do not depart from the technical effect of the present disclosure. All these alterations as made based on the spirit of the present disclosure are to be covered by the scope of the present disclosure.

What is claimed is:

1. A supporting mechanism comprising:
   a mounting assembly configured to be coupled to a gimbal;
   a supporting assembly configured to be coupled to an auxiliary apparatus; and
   a connection assembly including an assembling member, the assembling member including a rod portion, one end of the rod portion being adjustably connected to the mounting assembly in a rotation manner, and another end of the rod portion being adjustably connected to the supporting assembly in a linear movement manner;
   wherein a position of the auxiliary apparatus relative to the gimbal is adjustable at least by adjusting a linear position of the supporting assembly and a rotation position of the rod portion relative to the mounting assembly.

2. The supporting mechanism of claim 1, further comprising:
   an adjusting assembly provided between the mounting assembly and the connection assembly, the adjusting assembly being configured to adjust a coupling position of the connection assembly relative to the mounting assembly.

3. An adjusting device comprising:
   an adjuster; and
   a supporting mechanism including:
      a mounting assembly configured to be coupled to a gimbal;
      a supporting assembly coupled to the adjuster; and
      a connection assembly including an assembling member, the assembling member including a rod portion, a first end of the rod portion being adjustably connected to the mounting assembly in a rotation manner, and a second end of the rod portion being adjustably connected to the supporting assembly in a linear movement manner;
   wherein a position of the adjuster relative to the gimbal is adjustable at least by adjusting a linear position of the supporting assembly and a rotation position of the rod portion relative to the mounting assembly.

4. The adjusting device of claim 3, wherein the adjuster includes:
   a driving member provided on the supporting assembly; and
   an adjusting ring connected to the driving member, the adjusting ring being configured to be sleeved on a circumference of a lens of an imaging device and to adjust a focal length or an aperture of the imaging device.

5. The adjusting device of claim 4, wherein the adjuster further includes a transmission member between the driving member and the adjusting ring, the driving member being configured to drive the adjusting ring to rotate through the transmission member.

6. The adjusting device of claim 5, wherein:
   the transmission member includes a transmission gear; and
   the adjusting ring includes a driven tooth on an outer circumference of the adjusting ring, the driven tooth being fitted with the transmission gear.

7. The adjusting device of claim 5, wherein the adjuster further includes an operating knob provided on the transmission member.

8. The adjusting device of claim 4, wherein the adjusting ring includes a holding portion on an inner circumference of the adjusting ring, the holding portion being configured to abut against the lens of the imaging device.

9. The adjusting device of claim 3, wherein the adjuster includes a mounting base for coupling an imaging device, the mounting base being configured to connect with the gimbal and adjust a coupling height of the imaging device relative to the gimbal.

10. The adjusting device of claim 3, wherein the assembling member includes:
    a connecting portion provided on the rod portion, the connecting portion being adjustably sleeved on the supporting assembly.

11. The adjusting device of claim 10, wherein:
    the connecting portion includes:
       a ring portion including a non-closed ring; and
       two locking portions provided at two ends of the ring portion, respectively, and spaced from each other; and
    the connection assembly further includes a fastener configured to fasten the two locking portions to reduce an inner diameter of the ring to clamp the connecting portion onto the supporting assembly.

12. The adjusting device of claim 10, wherein:
    the connecting portion is a first connecting portion provided at the second end of the rod portion;
    the assembling member further includes a second connecting portion provided at the first end of the rod portion; and
    the first connecting portion and the second connecting portion are adjustably connected to the supporting assembly and the mounting assembly respectively.

13. The adjusting device of claim 3, wherein the supporting assembly includes a supporting member movably provided on the assembling member.

14. The adjusting device of claim 13, wherein the supporting assembly further includes a carrying member sleeved on the supporting member, the carrying member including an external connecting portion coupled to the adjuster.

15. The adjusting device of claim 14, wherein:
    the carrying member further includes:
       a ring portion including a non-closed ring; and
       two locking portions provided at two ends of the ring portion, respectively, and spaced from each other; and
    the connection assembly further includes a fastener configured to fasten the two locking portions to reduce an inner diameter of the ring to clamp the carrying member onto the supporting member.

16. The adjusting device of claim 15, wherein the external connecting portion is provided on one of the two locking portions or on the ring portion.

17. The adjusting device of claim 3, wherein the mounting assembly includes:
- a fixing member configured to be coupled to the gimbal; and
- a mounting member fixedly provided on the fixing member and coupled to the assembling member.

18. The adjusting device of claim 17, wherein:
the mounting member includes two mounting rods provided on the fixing member and spaced from each other.

19. A gimbal comprising:
- a supporting body;
- a carrying platform provided on the supporting body; and
- a supporting mechanism including:
  - a mounting assembly provided on the carrying platform;
  - a supporting assembly; and
  - a connection assembly including an assembling member, the assembling member including a rod portion, one end of the rod portion being adjustably connected to the mounting assembly in a rotation manner, and another end of the rod portion being adjustably connected to the supporting assembly in a linear movement manner.

20. The gimbal of claim 19, further comprising:
- an adjuster provided on the supporting assembly and configured to adjust a focal length or an aperture of an imaging device carried on the gimbal;
- wherein a position of the adjuster relative to the gimbal is adjustable at least by adjusting a linear position of the supporting assembly and a rotation position of the rod portion relative to the mounting assembly.

\* \* \* \* \*